(12) United States Patent
Schwob

(10) Patent No.: US 7,994,410 B2
(45) Date of Patent: Aug. 9, 2011

(54) MUSIC RECORDING COMPARISON ENGINE

(75) Inventor: Pierre R. Schwob, Palo Alto, CA (US)

(73) Assignee: Classical Archives, LLC, Palo Alto, CA (US)

( * ) Notice: Subject to any disclaimer, the term of this patent is extended or adjusted under 35 U.S.C. 154(b) by 149 days.

(21) Appl. No.: 12/256,208

(22) Filed: Oct. 22, 2008

(65) Prior Publication Data

US 2010/0106267 A1 Apr. 29, 2010

(51) Int. Cl.
*G10H 1/00* (2006.01)

(52) U.S. Cl. .......................... 84/600; 84/601; 324/76.21

(58) Field of Classification Search ............ 84/600–602; 324/76.21
See application file for complete search history.

(56) References Cited

U.S. PATENT DOCUMENTS

| | | | | |
|---|---|---|---|---|
| 6,528,715 | B1 | 3/2003 | Gargi | 84/615 |
| 6,539,395 | B1* | 3/2003 | Gjerdingen et al. | 1/1 |
| 7,035,775 | B2* | 4/2006 | Abe et al. | 702/189 |
| 7,081,579 | B2* | 7/2006 | Alcalde et al. | 84/608 |
| 7,626,111 | B2* | 12/2009 | Kim et al. | 84/600 |
| 2002/0026867 | A1 | 3/2002 | Hasegawa et al. | 84/609 |
| 2003/0023421 | A1* | 1/2003 | Finn et al. | 704/1 |
| 2003/0106413 | A1 | 6/2003 | Samadani et al. | 84/603 |
| 2003/0135377 | A1* | 7/2003 | Kurianski et al. | 704/500 |
| 2003/0183064 | A1* | 10/2003 | Eugene et al. | 84/609 |
| 2003/0233930 | A1* | 12/2003 | Ozick | 84/610 |
| 2003/0236661 | A1* | 12/2003 | Burges et al. | 704/205 |
| 2004/0001160 | A1* | 1/2004 | Herley | 348/465 |
| 2004/0001161 | A1* | 1/2004 | Herley | 348/465 |
| 2004/0260682 | A1* | 12/2004 | Herley et al. | 707/3 |
| 2005/0086682 | A1* | 4/2005 | Burges et al. | 725/19 |
| 2005/0091275 | A1* | 4/2005 | Burges et al. | 707/104.1 |
| 2006/0156343 | A1* | 7/2006 | Jordan | 725/50 |
| 2007/0113724 | A1* | 5/2007 | Kim et al. | 84/609 |
| 2007/0143108 | A1* | 6/2007 | Kurozumi et al. | 704/239 |
| 2007/0169613 | A1* | 7/2007 | Kim et al. | 84/609 |

(Continued)

FOREIGN PATENT DOCUMENTS

WO WO 2007045797 A1 * 4/2007

OTHER PUBLICATIONS

International Search Report, Int'l Pat. Appln. No. PCT/US09/60831. mailed Dec. 2, 2009. 2 sheets.

(Continued)

*Primary Examiner* — David S. Warren
(74) *Attorney, Agent, or Firm* — Fitzpatrick, Cella, Harper & Scinto

(57) ABSTRACT

A method is provided to compare recordings that includes providing a list of a plurality of recordings and selecting at least a first recording and a second recording from the plurality of recordings. The first recording and the second recording have predetermined lengths. The method also includes selecting a first portion of the first recording, identifying a second portion of the second recording based on the first portion, and comparing the first portion to the second portion. When the entire length of the recording is selected as the first portion, the entire length of the second recording can be identified as the second portion. Identifying a second portion may also include normalizing it to the first portion. Also, identifying the second portion can include translating the first portion into a wave-form, searching the second recording for another wave-form similar to the translated wave-form, and matching the translated wave form with the similar wave-form.

20 Claims, 7 Drawing Sheets

U.S. PATENT DOCUMENTS

| | | | |
|---|---|---|---|
| 2007/0174274 A1* | 7/2007 | Kim et al. | 707/5 |
| 2007/0282860 A1* | 12/2007 | Athineos et al. | 707/10 |
| 2008/0072741 A1* | 3/2008 | Ellis | 84/609 |
| 2008/0147739 A1* | 6/2008 | Cardamore | 707/104.1 |
| 2009/0049082 A1* | 2/2009 | Slaney et al. | 707/103 R |
| 2009/0049091 A1* | 2/2009 | Slaney et al. | 707/104.1 |
| 2009/0055376 A1* | 2/2009 | Slaney et al. | 707/5 |
| 2009/0132074 A1* | 5/2009 | Yamada | 700/94 |
| 2010/0023328 A1* | 1/2010 | Griffin et al. | 704/231 |
| 2010/0106267 A1* | 4/2010 | Schwob | 700/94 |
| 2010/0125582 A1* | 5/2010 | Zhang et al. | 707/741 |
| 2010/0198760 A1* | 8/2010 | Maddage et al. | 706/12 |

OTHER PUBLICATIONS

Written Opinion of the International Searching Authority, Int'l Pat. Appln. No. PCT/US09/60831. mailed Dec. 2, 2009. 4 sheets.

International Preliminary Report on Patentability, Int'l Pat. Appln. No. PCT/US09/60831, mailed Apr. 26, 2011, 6 sheets.

* cited by examiner

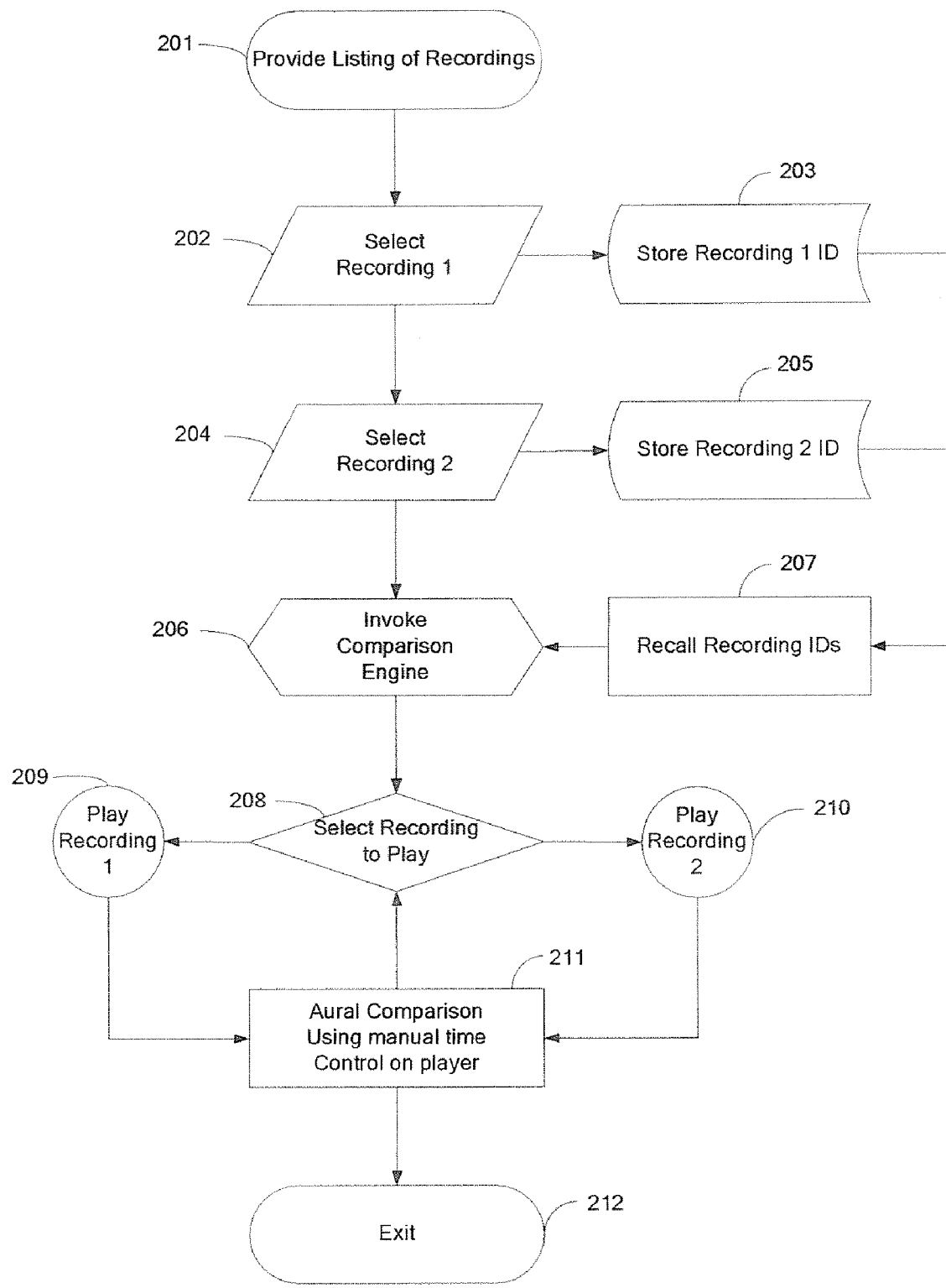
FIG. 2. Track Selection and Comparison (Manual Time Control)

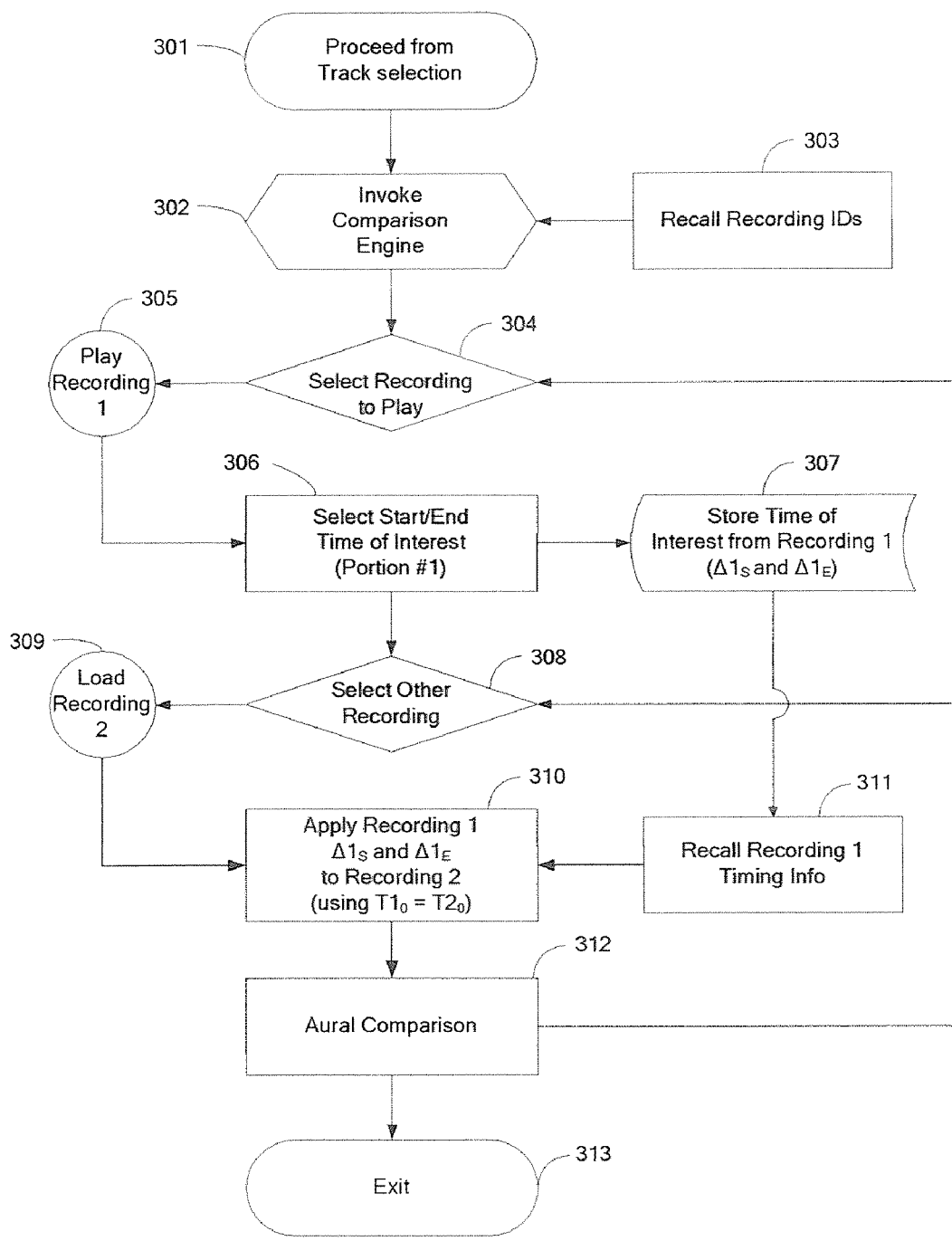

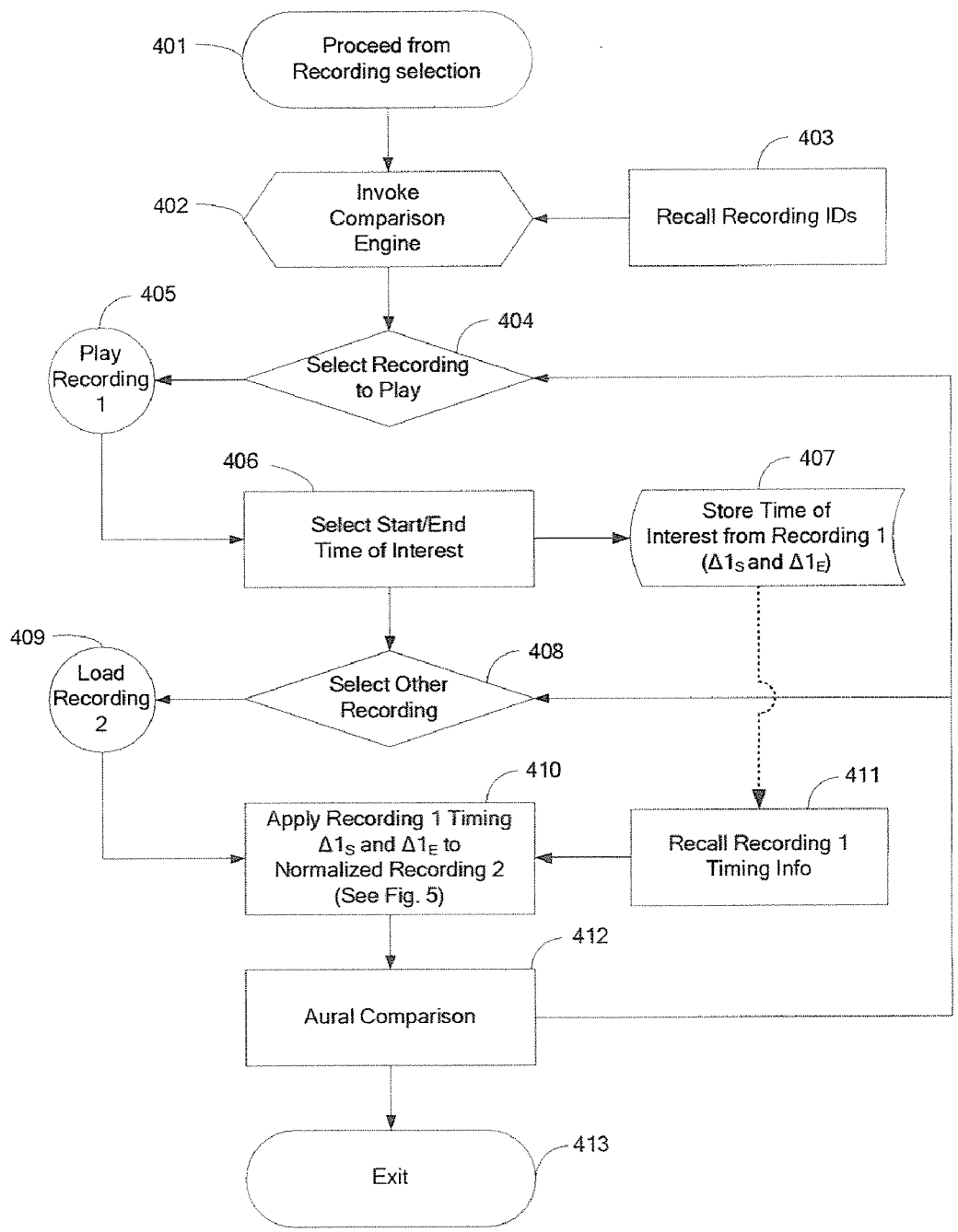
FIG. 4. Track Selection and Comparison (Normalized Time Base)

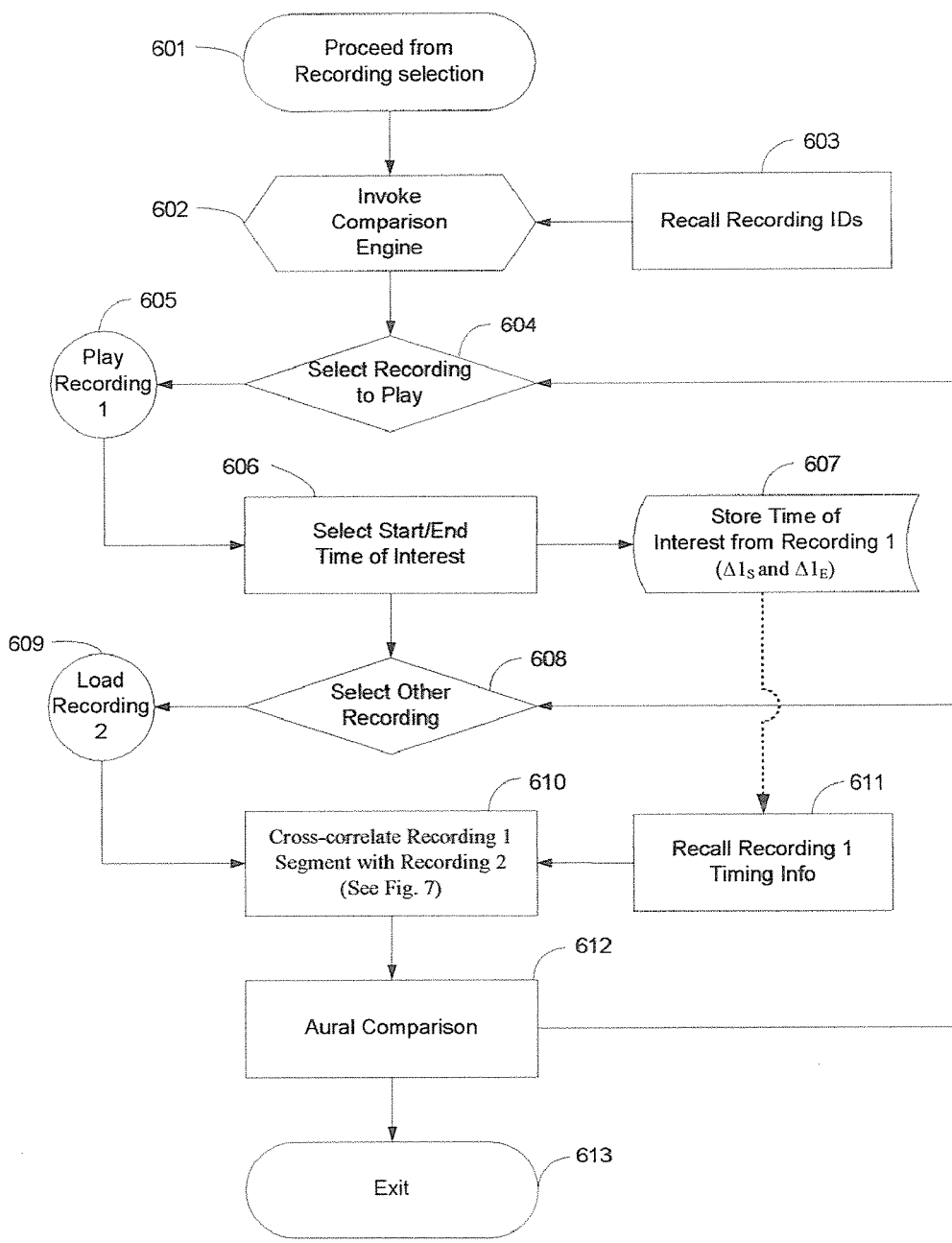
FIG. 6. Track Selection and Comparison (Cross-Corrolation Base)

MUSIC RECORDING COMPARISON ENGINE

FIELD OF THE INVENTION

The invention relates generally to recordings, and more particularly to methods for comparing two or more time-based segments of audio recordings.

BACKGROUND OF THE INVENTION

Music is often classified by genres, such as pop/rock, classical, folk, blues, country, and the like. Also, different versions of the same song are often recorded by different artists, and even the same artist may record variations of their own songs over the span of their career, such as, for example by performing a solo as a duet and performing an instrumentally accompanied song a cappella. While some music genres, such as pop/rock, have fewer different versions of the same song other genres lend themselves to having multiple versions. For example, genres that include predominantly older works, such as classic rock, "oldies" music, folk music, and classical music, often have identical portions of a work recorded by many different artists. For example, three different orchestras each conducted by a different conductor can each have its performance of Beethoven's Sixth Symphony recorded, resulting in three inherently unique versions of that symphony. However, because each performance is unique, a simple search for Beethoven's Sixth Symphony, either in a music store or in an online Internet library, will list three separate entries. Unfortunately, without knowing anything more than the title of the work, a person cannot easily ascertain the differences between the three recordings without listening to all three songs individually, which may not be convenient for a shopper who must either sample a small portion of the recording or purchase the entire recording prior to listening. In the case of sampling a portion of the recordings, the small sampling of each work may be insufficient to discern the differences and may not sample the portion of the music that the listener is particularly interested in isolating.

SUMMARY OF THE INVENTION

A method is provided to compare recordings that includes providing a list of a plurality of recordings and selecting at least a first recording and a second recording from the plurality of recordings. The first recording and the second recording have predetermined lengths. The method also includes selecting a first portion of the first recording, identifying a second portion of the second recording based on the first portion, and comparing the first portion to the second portion. When the entire length of the recording is selected as the first portion, the entire length of the second recording can be identified as the second portion. Identifying a second portion may also include normalizing it to the first portion. Also, identifying the second portion can include translating the first portion into a wave-form, searching the second recording for another wave-form similar to the translated wave-form, and matching the translated wave form with the similar wave-form.

BRIEF DESCRIPTION OF THE DRAWINGS

The features and advantages of the present invention will become more apparent from the following description of the invention taken in conjunction with the accompanying drawings, wherein like reference characters designate the same or similar parts and wherein.

FIG. 2 is a flow chart of a method in accordance with an embodiment of the invention.

FIG. 3 is another flow chart of a method in accordance with another embodiment of the invention.

FIG. 4 is another flow chart of a method in accordance with another embodiment of the invention.

FIG. 6 is another flow chart of a method in accordance with another embodiment of the invention.

DETAILED DESCRIPTION

In a first aspect of the invention, a method is provided to compare recordings, which is particularly suitable for comparing audio recordings. The method may be especially suited for comparing audio recordings, but is not so limited. In a first aspect of the invention, the method includes providing a list of a plurality of recordings and selecting at least a first recording and a second recording from the plurality of recordings. The first recording and the second recording have predetermined lengths. The method also includes selecting a first portion of the first recording, identifying a second portion of the second recording based on the first portion, and comparing the first portion to the second portion. The list of the recordings may be presented, for example, in a web page which can be viewed by an Internet user through a home computer or other internet enabled device, including, but not limited to a computer, telephone, personal digital assistant, digital media player, set top box, or Internet appliance. Moreover, the list of recordings may be presented on a television through a cable television signal. Also, the list may be stored locally on a client computer and the recordings themselves may also be stored on the client computer which may not be connected to a network. It is to be understood however, that the methods for comparing audio compositions in the context of an Internet based system, described herein are not limited to use in conjunction with any specific technology or device, such as such Internet technology or a computer, but may be broadly practiced separate from such technologies.

Figure 1:
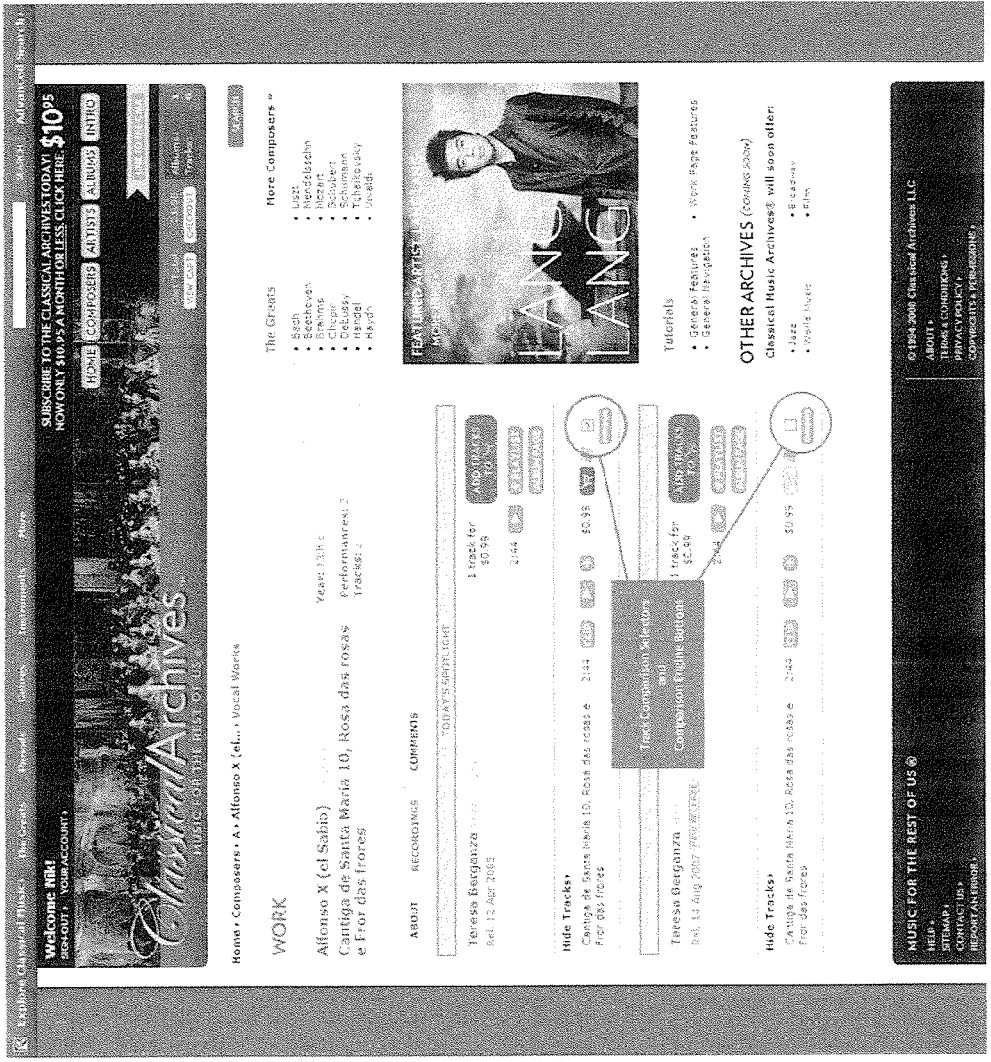
FIG. 1 shows a listing of a plurality of recordings presented in a web page in accordance with an embodiment of the invention.

FIG. 1 shows an example of a web page in accordance with a preferred embodiment of the present invention that provides access to classical music to subscribers to the Internet archive. For example, the Internet archive can include a database of musical recordings that can be accessed for downloading and listening through the subscriber web page interface shown in FIG. 1. It should be noted that it is common for users of personal computers to have stored thereon libraries or databases of music files that may also supplement or be used in place of the online database. Moreover, in one embodiment a user may execute a program, stored on the user's computer rather than on a remote server, which can be used to access and compare recordings in accordance with the methods described herein. The listing in FIG. 1 shows that there are two performances (i.e., recordings) for the performance of the work entitled 'Cantiga de Santa Maria 10, Rosa das rosas e Fror das frores' by the artist named Teresa Berganza. The first recording was released on Apr. 12, 2005 and is listed as being 2 minutes and 44 seconds in duration, while the second recording was released on Aug. 14, 2007 and has the same duration. The two tracks may be compared by selecting the checkboxes above the comparison engine button labeled 'compare', which initiates a comparison engine, described below, with reference to various embodiments of the comparison engine.

FIG. 2 is a flow chart showing the steps in one embodiment of a method of comparing recordings in accordance with the present invention. At step 201 a listing of recordings is provided, such as the listing in the web page shown in FIG. 1. In step 202, a first recording is selected and the associated identification information of the recording is stored, as shown in step 203. The recording identification information can be used to recall the recording selection. In step 204, a second recording is selected and that selection is stored, as shown in step 205. While only two recordings are shown as being selected in FIG. 2. It is to be understood that more than two recordings may be selected. The selection and storage of the recording identification information builds a comparison list of recordings. In one embodiment, the listing is provided in a web page and the comparison list can issue as a session cookie which is remembered while the user remains on the web site of the web page. Alternatively, the comparison list can be saved as a JavaScript variable which is also remembered while the user is still on the same page. Also, the comparison list can be submitted to a database (e.g., through an Ajax call) located on the server which is added to the user profile so that this data can be remembered across several sessions.

In step 206 the comparison engine can be invoked. As already mentioned above, the comparison engine may be invoked by clicking on the button labeled "compare" on the web page shown in FIG. 1. In step 207 the identification information of the selected recordings is recalled for the comparison. At step 208 the user can select one of the recordings selected to play in accordance with steps 209 and 210. In the case of audio recordings the selected recording can be output to the user aurally, such as via speakers or a headset. While each recording is played the user may use a set of manual controls to control the playback of the recording. For example, during playback the user may use a manual time control to stop, pause, slow, hasten, or move to a specific portion of the recording or otherwise delineate a listening window within the recording for later comparison to another recording. Likewise, the second and other recordings can be played like the first recording. At step 211 the played recordings or portions thereof can be compared aurally, such as by sequentially playing back those selections.

FIG. 3 is a flow chart showing the steps of another embodiment of a method of comparing recordings in accordance with the present invention. As in the embodiment represented by FIG. 2, a first and second recording are selected in step 301 and the comparison engine is invoked at step 302. The recording information is recalled at step 303 and the first track is selected in step 304 and is played at step 305. During or after playback of the first recording, in step 306 the start time and end time of a portion of interest to the user, called a first portion for convenience, can be selected. For example, when the comparison engine is a web page a visual playback indicator, such as a slider bar, may be used to show the length of the recording and the elapsed time during playback with a pointer moving along the bar. The user may be able to place markers on the playback bar to indicate the beginning and ending times of the first portion. These times of interest represented by the markers are stored in step 307. Further, these markers may be represented by $\Delta 1_S$, which is the start time of the first portion measured from the beginning $T1_0$ or $T2_0$ of the recording, and $\Delta 1_E$, which is the end time of the first portion measured from the beginning $T1_0$ or $T2_0$ of the recording. Alternatively, the sliders may be adjusted along the playback bar to delineate an adjusted beginning and ending of the first portion. Of course the first portion of the first recording may be selected in other ways, and those discussed above are not intended to limit the scope of the invention. The start and end times of the first portion can be referenced back to the beginning of the first recording or to another fixed point in the recording. The second recording is then selected at step 308 and the recording information is loaded at step 309. At step 310 the start and end times of the first portion are superimposed onto the second recording to create a second portion of interest, called the second portion for convenience. In step 310 the two portions are aurally compared. Another recording to be compared can be selected at step 304 or the process may end at step 313.

Figure 3A:
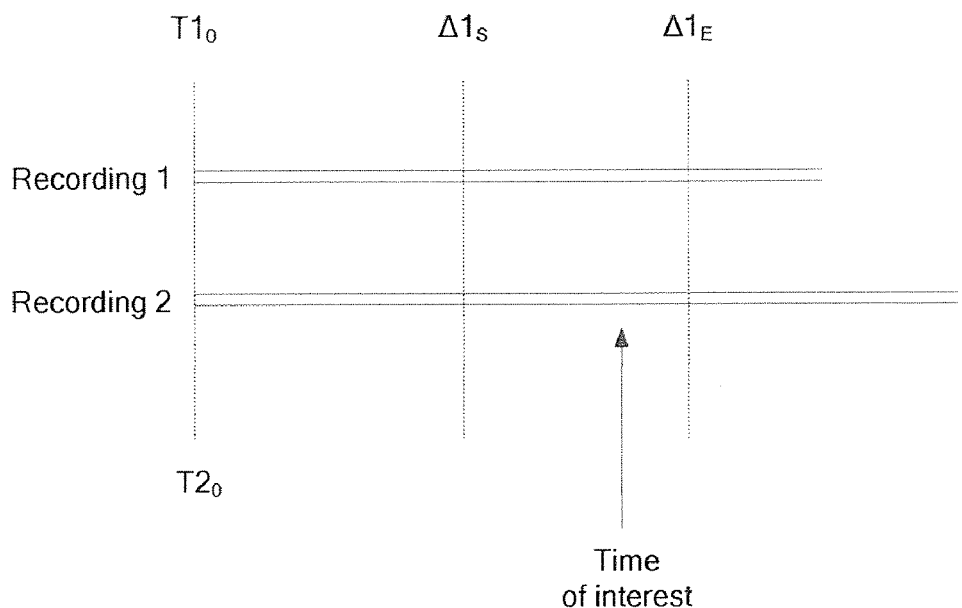
FIG. 3A is a time chart showing the start and end times of two portions of two recordings desired for comparison.

FIG. 3A is a time chart showing the relationship between the start and end times $\Delta 1_S$ and $\Delta 1_E$ on the first and second portions. Superimposing the start and end times as shown allows the user to isolate and compare portions of the two recordings at the same times measured from the beginning of the recordings. This may be useful where the two recordings are of similar duration and where the same portion of the song is expected at roughly the same time measured from the beginning of both recordings.

However, in some instances, because the first portion in the first recording may not be located at the same time in the second recording. Superimposing the same start and end times on the second recording may not necessarily locate a portion of the second recording which is similar to that of the first recording. This is especially true where the two recordings have different overall lengths. For example, some classical recordings are of concerts which have periods of audience applause followed by a period of musical performance. Sometimes this applause becomes part of the recording that precedes the music. If such a recording is compared to an otherwise similar recording where such applause is omitted, the portions of interest of the two recordings will be shifted in time by an amount roughly equal to the time of the applause. Also, two recordings may have different tempos or may have been recorded at differing recording speeds, so that, not only is the time of the start of the second portion shifted, but also the length of the second recording (and therefore the second portion in the second recording) is also different. To account for such variations in the recordings a further embodiment of the method of comparing recordings is described below with reference to the flowchart shown in FIG. 4.

Figure 5:
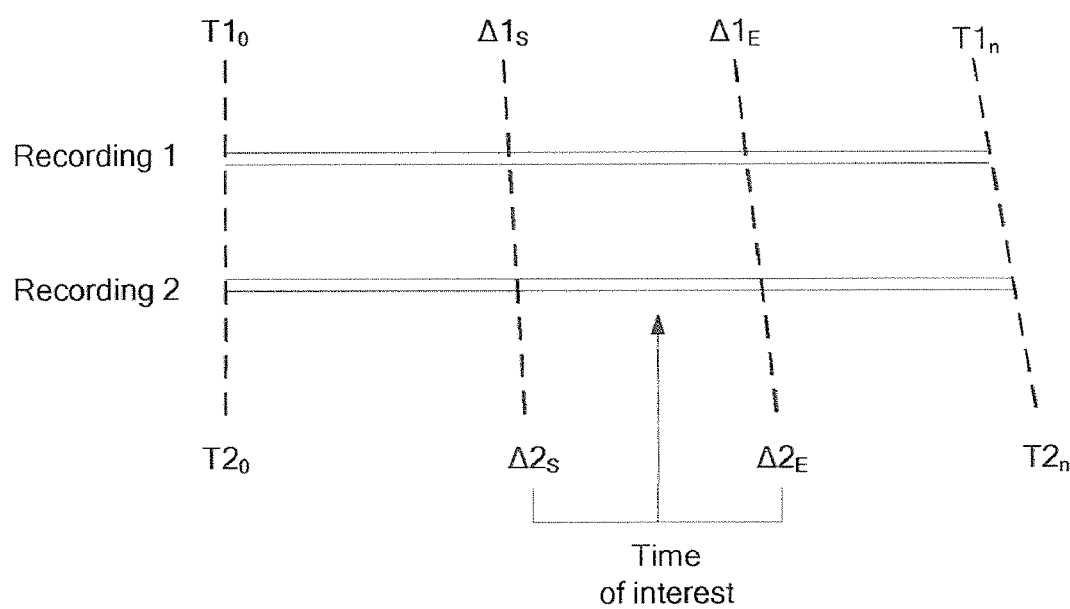
FIG. 5 is a time chart showing the relationship between two recordings to be compared in accordance with an example embodiment of the invention.

In the method depicted in FIG. 4, as in FIGS. 2 and 3, at least a first and a second recording are shown as selected and the identification information about the recordings are stored at step 401. At step 402 the comparison engine is invoked. Previously stored recording information is recalled in step 403 and the first track is selected in step 404 and is played in step 405. As in the method described with reference to FIG. 3, during or after playback of the first recording, the start time and end time of a portion of interest to the user can be selected at step 406 in a similar fashion. At step 408 the second recording is selected and the previously stored identification information about that recording is loaded at step 409. At step 410 the timing information from the selection made in step 406 is used to normalize the selection of a second portion of the second recording. The second portion can be normalized by applying a normalizing factor to the first portion of the first recording. For example, with reference to FIG. 5, the total length of the first recording $T1_n$ may be 120 seconds, while the total length of the second recording $T2_n$ may be 150 seconds. Because the two recordings are believed to be related, it is assumed that portions of the two recordings are related based on timing. Thus, in this example the normalization factor is taken to be equal to the ratio of the length of the second recording $T2_n$ to the length of the first recording $T1_n$ (i.e., $T2_n/T1_n=150/120=1.25$). Therefore, it is assumed that that the first 1 second of playback of the first recording will be related to the first 1.25 seconds of playback of the second recording, and so on through the two recordings. If the start time of the first portion $\Delta 1_S$ (measured from the beginning of the first recording) is 40 seconds and the end time $\Delta 1_E$ is 80 seconds, then the normalizing factor applied to those times results in a second portion defined by a start time $\Delta 2_S$ of 50 seconds (1.25×40 seconds) and an end time $\Delta 2_E$ of 100 seconds (1.25×80 seconds), respectively, from the beginning of the second recording, for a total duration of the second portion of 50 seconds ($T2_n/T1_n \times (\Delta 1_E - \Delta 1_S) = 1.25 \times 40$ seconds). As mentioned above, when the lengths of the two recordings differ, normalizing the second portion to the first portion may yield better results in isolating a portion of the second portion which is similar to the first portion, than if the start time and end time of the first portion were simply used for delineating the second portion. The first and second portions can be aurally compared at step 412, and another recording can then be selected at step 404 for comparison or the comparison can end at step 413.

Another exemplary embodiment of the method of comparing a plurality of recordings in accordance with the present invention is shown with reference to the flowchart in FIG. 6. In FIG. 6, as in FIGS. 2, 3, and 4, at least a first and a second recording are selected and the identification information about the recordings is stored at step 601. At step 602 the comparison engine is invoked. The recording information is recalled at step 603 and the first track is selected at step 604 and is played at step 605. As in the method described with reference to FIGS. 3 and 4, during or after playback of the first recording the start time and end time of a portion of interest to the user can be selected at step 606 in a similar fashion to that described above with respect to FIGS. 3 and 4. At step 608 the second recording is selected and the identification information about that recording is loaded at step 609. At step 610 the first portion selected is cross-correlated with the second recording to isolate a portion (i.e. a second portion) of the second recording which is similar to the first portion. For example, in one embodiment, the first portion is translated into a wave-form as shown in the time domain graphs of the first recording and first portion in FIG. 7. The comparison engine can search for a similar wave pattern in the second recording and identify a start and end time for the identified second portion. At step 612 the first portion and the second portion can be aurally compared Another recording can then be selected at step 604 for comparison or the comparison can end at step 613.

Figure 7:
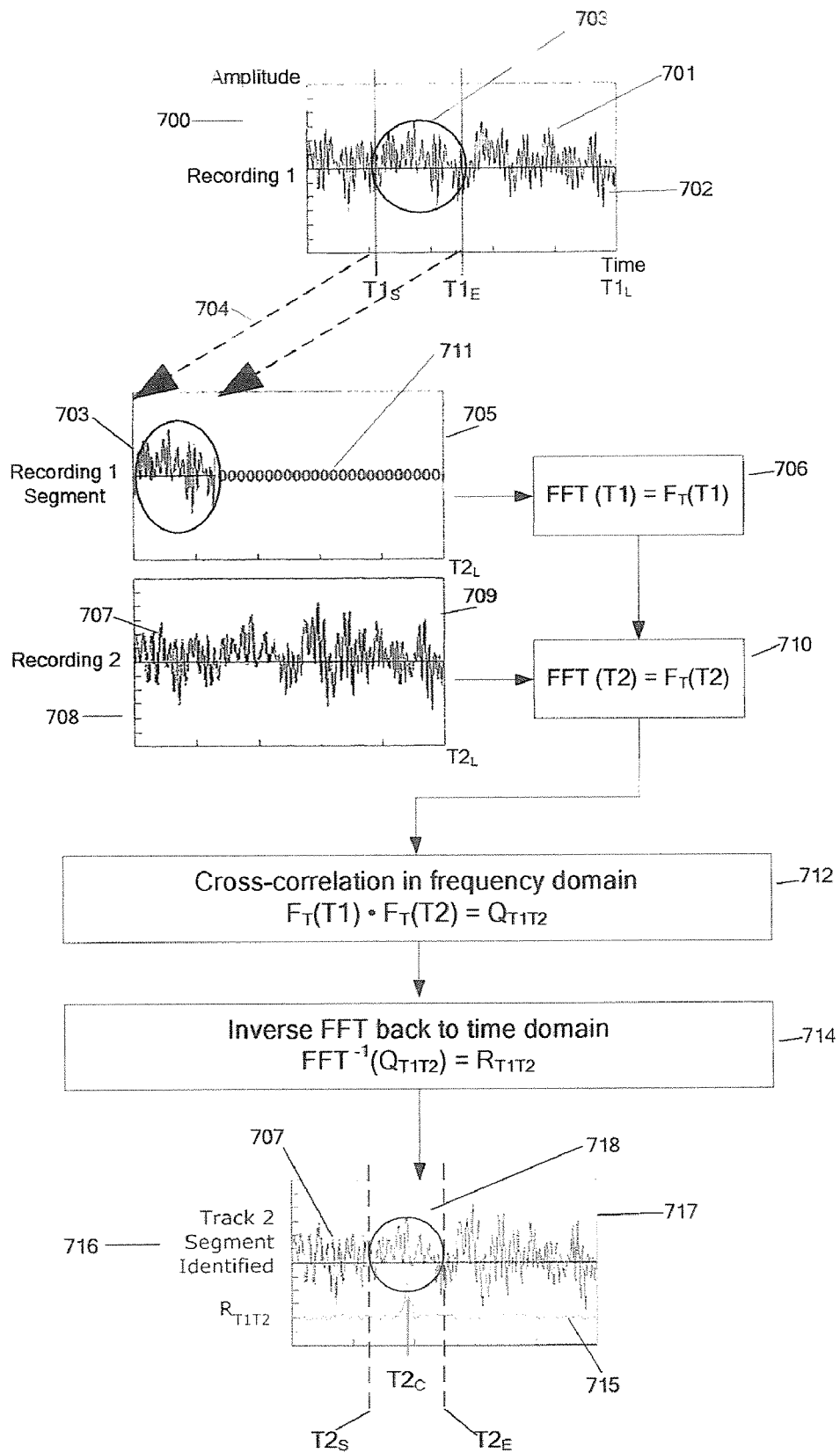
FIG. 7 shows the comparison of wave-forms of two recordings in accordance with an embodiment of the invention.

FIG. 7 shows an example of how the second portion is identified in accordance with the embodiment of the method described above with respect to the flowchart in FIG. 6. In this example, the first recording is converted in step 700 to a first recording wave form 701, as shown depicted in a graph 702 showing the amplitude of the first recording wave form 701 versus elapsed time. At step 708 the second recording is converted to a second recording wave form 707, as shown depicted in graph 709 showing the amplitude of the second recording wave form 707 versus elapsed time.

At step 704 a first portion wave form 711 (shown in graph 705) is formed by modifying the first recording wave form 701. As shown graphically in graph 702, a first portion 703 of the first recording wave form 701 is selected having an elapsed start time $T1_S$ and an elapsed end time $T1_E$. At step 704 a portion of the first recording wave form 701 before the elapsed start time $T1_S$ is discarded and the first portion 703 is translated or otherwise shifted to be at the beginning of the first portion wave form 711, as shown in graph 705. Further, at step 704, the length $T1_L$ of the first recording wave form 701 is adjusted to be equal to the length $T2_L$ of the second recording wave form 707 and the amplitude of the first portion wave form 711 after the first portion 703 is set equal to zero.

At step 706 a fast Fourier transform of the first portion wave form 711, FFT(T1), is generated and is equated with the discrete Fourier transform of the first portion wave form 711, $F_T(T1)$. At step 710 a fast Fourier transform of the second recording wave form 707, FFT(T2), is generated and is equated with the discrete Fourier transform of the second recording wave form 707, $F_T(T2)$. At step 712 the first portion wave form 711 and the second wave form 707 are cross-correlated in the frequency domain, by calculating the product of the conjugate of one of the respective discrete Fourier transforms (e.g., FFT(T1)) with the other discrete Fourier transform (e.g., FFT(T2)). In step 714 the inverse fast Fourier transform of that product is calculated to generate a time domain correlation wave form 715, shown on graph 717 with the second wave form 707.

As shown in graph 717, at step 716, the correlation wave form 715 is compared with the second recording wave form 707 in the time domain. A maximum amplitude of the correlation wave form 715 is located at a certain correlation time $T2_C$, elapsed from the beginning of the second recording wave form 707. The correlation time $T2_C$ indicates an elapsed time in the second recording at which the first portion wave form 711 is most highly correlated with the second recording wave form 707. That is, the elapsed time of the second recording wave form 707 at the location of the maximum amplitude, correlation time $T2_C$, of the correlation wave form 715 is identified as the point in the second recording where first portion 703 is determined to be most likely to be located. The second portion 718 of the second recording can be identified as spanning a duration between a start time $T2_S$ at a certain time before the correlation time $T2_C$, and an end time $T2_E$, at a certain time after than the correlation time $T2_C$. The start time $T2_S$ and end time $T2_E$ can also be determined based on the correlation time $T2_C$, such as by calculating a predetermined offset duration before or after the correlation time $T2_C$. Such offset durations before or after the correlation time $T2_C$ can be equal and can also be based on the duration of the first portion 703. For example, in one embodiment, the offset duration before or after the correlation time $T2_C$ can be equal to a percentage of the duration of the first portion 703, such as 50% or 100%. The second portion 718 and the first portion 703 can then be aurally, or otherwise, compared by a listener or by an apparatus.

Accordingly, the present invention provides a music listener or purchaser with a method for easily choosing one of among a number of different renditions of the same piece, according to his or her preference The choice may be made without requiring the listener or purchaser to hear the entirety of the respective renditions of the piece. Therefore, the time of the listener or purchaser is used efficiently. Further, while the preferred embodiments have been described with respect to comparison of different renditions of musical compositions, the present invention may be applied to comparing any type of recording such as a theatrical production or poetry reading that is rendered or performed in multiple forms.

While the invention has been described with reference to specific preferred embodiments, it is to be understood that deviations from such embodiments may be possible without deviating from the scope of the invention. Moreover, the methods described herein may embodied in a computer program stored on a computer-readable medium and the methods may be executed by a processor capable of executing the program stored on the computer-readable medium. The computer readable medium may also be a computer-readable program product The computer program may be executed by a processor of a server computer which is connected to a client computer via a network, such as a LAN/WAN wired/wireless network, and the Internet. Moreover, the computer program may be similarly executed by a processor of a client computer. Such client computer may have access to a database of stored recordings and/or may be configured to be in communication via a network to one or more computers which have recordings stored thereon.

What is claimed is:

1. A method of comparing a plurality of recordings, including:
    providing a list of a plurality of recordings;
    accepting selections of at least a first recording and a second recording from the list of the plurality of recordings, wherein the first recording and the second recording have predetermined lengths;
    accepting a selection of a first portion of the first recording;
    identifying a second portion of the second recording based on the first portion; and
    comparing the first portion to the second portion,
    wherein the step of accepting selections of the first portion of the first recording includes accepting selections of the start time and the end time of the portion of the first recording thereby to define the first portion,
    wherein the step of identifying a second portion includes normalizing the second portion to the first portion, and
    wherein the step of normalizing the second portion includes:
    generating a normalization factor; and
    applying the normalization factor to the start time and end time of the first portion.

2. The method of claim 1, further including aurally playing the first recording.

3. The method of claim 1, further including storing the selections of the first and second recordings selected and storing the first portion of first recording selected.

4. The method of claim 1, wherein the list is provided on a web page and wherein the plurality of recordings are stored in a database which can be accessed responsive to selection of the first and second recordings from the web page providing the list.

5. The method of claim 1, wherein the recording is an audio recording.

6. The method of claim 1, wherein the comparing step includes aurally comparing the first portion to the second portion.

7. The method of claim 1, wherein when the entire length of the recording is selected as the first portion in the first portion selecting step, the entire length of the second recording is identified as the second portion in the identifying step.

8. The method of claim 1, wherein the start time and the end time are selected with reference to a fixed reference time in the recording.

9. The method of claim 8, wherein the fixed reference time is the start of the recording.

10. The method of claim 1, wherein the normalization factor generating step generates the normalization factor based on the respective lengths of the first recording and the second recording.

11. The method of claim 10, wherein the normalization factor generating step generates the normalization factor as a ratio of the length of the second recording to the length of the first recording.

12. The method of claim 1, wherein the step of applying the normalization factor delineates a second portion having a normalized start time and normalized end time.

13. The method of claim 12, wherein the normalized start time is equal to the product of the normalization factor and the start time of the first portion.

14. The method of claim 13, wherein the normalized end time is equal to the product of the normalization factor and the end time of the first portion.

15. A method of comparing a plurality of recordings, including:
    providing a list of a plurality of recordings;
    accepting a selection of at least a first recording and a second recording from the list of the plurality of recordings, wherein the first recording and the second recording have predetermined lengths;
    accepting a selection of a first portion of the first recording;
    translating the selected first portion of the first recording into a first portion wave form;
    identifying a second portion of the second recording based on the first portion, including translating the second recording into a second wave form; and
    comparing the first portion to the second portion, including comparing the first portion wave form with the second wave form,
    wherein the step of accepting a selection of the first portion of the first recording includes accepting selections of the start time and the end time of the portion of the first recording thereby to define the first portion, and
    wherein comparing the first portion wave form with the second wave form includes generating a cross-correlation wave form ($R_{T1T2}$) according to the relation:

$R_{T1T2} = FFT^{-1}(FFT(T1) \cdot FFT(T2))$, where $FFT(T1) \cdot FFT(T2)$ represents a product of a conjugate of a fast Fourier transform of the first portion wave form and a fast Fourier transform of the second wave form, and where $FFT^{-1}$ is an inverse fast Fourier transform of the product.

16. The method of claim 15, wherein comparing the first portion wave form and the second wave form includes identifying an elapsed correlation time measured from a beginning of the second wave form where the cross-correlation wave form ($R_{T1T2}$) is a maximum.

17. The method of claim 16, wherein the step of identifying the second portion further includes identifying a start time of the second portion as at least a certain elapsed time prior to the identified elapsed correlation time and identifying an end time of the second portion as at least another certain elapsed time after the elapsed correlation time.

18. The method of claim 15, wherein the step of comparing includes aurally comparing the first portion and the second portion.

19. A computer-readable program product comprising a non-transitory computer-usable medium having control logic stored therein for causing a computer to enable a user to compare a plurality of recordings, the control logic comprising:
    computer-readable program code for causing the computer to execute the method according to claim 1.

20. A computer-readable program product comprising a non-transitory computer-usable medium having control logic stored therein for causing a computer to enable a user to compare a plurality of recordings, the control logic comprising:
    computer-readable program code for causing the computer to execute the method according to claim 15.

* * * * *